Patented Oct. 21, 1952

2,615,011

UNITED STATES PATENT OFFICE 2,615,011

PREPARATION OF VINYL ESTERS OF A STABILIZED ROSIN ACID

John C. Robinson, Jr., Wilmington, Del., assignor to Hercules Powder Company, Wilmington, Del., a corporation of Delaware No Drawing. Application February 18, 1950, Serial No. 145,079

15 Claims. (Cl. 260—100)

This invention relates to a process for the manufacture of vinyl esters of carboxylic acids. More particularly, it relates to a process for the manufacture of vinyl esters of rosin acids.

Various procedures are known for the production of vinyl esters of carboxylic acids generally. One of these procedures involves the reaction of acetylene with the desired acid in the presence of a suitable catalyst. Another procedure, and one to which this invention particularly relates, is that which involves acidolysis of vinyl acetate using a desired carboxylic acid having at least 3 carbon atoms in the presence of a mercury catalyst. This method is described in U. S. 2,299,862.

While it has been postulated, as evidenced by the aforesaid patent, that rosin may be converted to the vinyl ester in this manner, this assumption has proven to be incorrect. Rosin does not in fact acidolyze vinyl acetate to yield the vinyl ester of rosin acid when these two materials are treated according to the teachings of the patent.

I have recently found, however, that for some obscure reason it is only necessary to give the rosin acid a preliminary treatment which will have the effect of chemically stabilizing it in order to get the rosin acid to undergo the acidolysis reaction with vinyl acetate under conditions which are essentially the same as those described in the above-mentioned patent. By a chemical stabilization treatment, there is meant either hydrogenation of the rosin acid to provide a hydrogenated rosin acid or dehydrogenation of the rosin acid to provide a dehydrogenated rosin acid. It is well known to the art that either the hydrogenation or dehydrogenation of a rosin acid has a stabilizing effect thereon in the sense that the products of such treatments are much more stable to air oxidation than are the rosin acids from which they are derived. The reason, however, for the stabilization treatments having the effect which provides the basis for this invention is quite obscure.

This invention then comprises a process for preparing a vinyl ester of a rosin acid which in turn comprises subjecting a rosin acid to a chemical stabilization treatment which may be either a hydrogenation treatment or a dehydrogenation treatment, heating the resulting chemically stabilized rosin acid with an excess (on a molar basis) of a vinyl ester of a low molecular weight saturated fatty acid in the presence of a catalytic amount of a mercury salt of a strong acid or other equivalent catalyst, and separating the resulting vinyl ester of the stabilized rosin acid from the other ingredients of the reaction mixture. The other ingredients of the reaction mixture will comprise unreacted stabilized rosin acid and vinyl ester, catalyst, low molecular weight acid produced in the acidolysis reaction, polymeric substances derived from the foregoing materials, etc. The simplest and most practical means of separating the desired vinyl ester of the stabilized rosin acid from the other materials is by distillation.

In carrying out this invention, there should be employed a substantial excess on a molar basis of the vinyl ester of the low molecular weight acid over the stabilized rosin acid. This results from the fact that the reaction is reversible and the fact that the law of mass action applies. Other factors appear to be (1) greater polymerization of the vinyl ester of stabilized rosin acid at the low ratios of vinyl ester of the low molecular weight acid to stabilized rosin acid and (2) formation of mixed ethylidene diesters at such low ratios. Preferably, the vinyl ester is employed in the amount of at least 3 mols of the ester per mol of the stabilized rosin acid. The optimum ratios for practical operations are those lying in the range from about 6 mols to about 10 mols of vinyl ester per mol of stabilized rosin acid.

Having described the invention in its broadest aspects, the following examples are given as illustrative embodiments thereof. They should not be considered as limiting the invention, however, but merely as specific embodiments of the broad concept. All parts and percentages in this specification and claims are by weight unless otherwise indicated. The pressures mentioned in the examples (microns Hg and mm. Hg) have reference to absolute pressure.

Example 1

A dehydrogenated rosin was prepared by heating N wood rosin with a palladium catalyst in the absence of added substances capable of reducing the unsaturation thereof. The resulting product had a dehydroabietic acid content of about 45% and an abietic-type resin acid content of 0%.

To a 5-liter, round bottom flask was charged 1000 g. of the above dehydrogenated rosin and 2200 ml. of commercial grade vinyl acetate. The mixture was refluxed on a steam bath. When solution of the rosin was effected, 20 g. of mercuric acetate and 1.5 ml. of concentrated sulfuric acid (95%) were added. The contents of the flask were mixed and refluxed for 4 hours. The flask was then cooled with tap water, 50 g. of sodium acetate were added to inactivate the catalyst, and the contents thoroughly mixed. The flask was then permitted to remain without agitation for ½ hour during which the major part of the solids present (largely sodium sulfate) settled out. The supernatent liquid was filtered off into a second 5-liter, round bottom flask. The vinyl acetate was then stripped off at atmospheric pressure on a steam bath. The acetic acid and the last of the vinyl acetate were removed under slightly reduced pressure. The residue was dissolved in 2 liters of ethyl ether and washed with three 1-liter portions of hydrochloric acid (1 part of concentrated HCl (35%) to 3 parts of water). It was then washed with three 1-liter portions of 2% sodium hydroxide, and the residual alkali remaining in the ether solution was removed by washing with water until neutral. The ether solution was dried with anhydrous sodium sulfate, the solution filtered, and the ether distilled off at atmospheric pressure. Pressure was then reduced and the vinyl ester of the dehydrogenated rosin distilled from 168° C. at 425 microns Hg to 205° C. at 400 microns Hg.

The product so obtained was a light yellow liquid. It was obtained in the amount of 1484 g. which is 74% by weight of the dehydrogenated rosin reacted. This product had a saponification number of 150.5 and an acid number of 2.9. This material was redistilled into fractions that were somewhat lighter in color than the first distillate.

*Example 2*

A quantity of 200 g. of the dehydrogenated rosin employed in Example 1 was reacted with 220 ml. of vinyl acetate in the manner described in Example 1. The sodium acetate was reduced in the ratio of 5 parts to 3 parts. Otherwise, the procedure was identical down through the distillation of the excess of vinyl acetate and acetic acid. The residue was distilled without further treatment. The product boiled from 144–180° C. at 0.1 to 0.2 mm. Hg. The pot temperature varied from 164° C. to 210° C.

In this manner a product was obtained which was somewhat darker in color than that obtained in the longer procedure of Example 1 in which the crude vinyl ester of the dehydrogenated rosin was washed a number of times prior to distillation. The product was obtained in the amount of 129.9 g. It had an acid number of 8.5 and a saponification number of 169.5.

*Example 3*

One hundred grams of the dehydrogenated rosin of Example 1 was converted to the vinyl ester in the manner described in Example 1 down to and including the filtration step. Two hundred twenty milliliters of vinyl acetate was employed in the reaction. Prior to use it was distilled in order to remove the copper acetate stabilizer which it contained. After the filtration step above referred to, the excess vinyl acetate and the acetic acid formed in the reaction were distilled off, and the residue remaining was distilled at 6 mm. Hg pressure. The vinyl ester of the dehydrogenated rosin boiled between 180° C. and 212° C. and was obtained in the amount of 56 g., the yield thereby being 56%. The color of the vinyl ester so obtained was substantially the same as that of the product of Example 2. It had an acid number of 4 and a saponification number of 165.

*Example 4*

A hydrogenated rosin was prepared by subjecting N wood rosin to hydrogen in the presence of a palladium-on-charcoal catalyst. The resulting product was one which was 98% saturated with hydrogen and which had an abietic-type resin acid content of 0%.

This experiment was run in duplicate. Into a 5-liter, round bottom flask was weighed 1000 g. of the hydrogenated rosin. The rosin was dissolved in 2200 ml. of vinyl acetate by refluxing on a steam bath. Thereafter 20 g. of mercuric acetate and 1.5 ml. of concentrated sulfuric acid (95%) were added. The reaction mixture was refluxed for 4 hours and cooled. Thirty parts of sodium acetate was added to the reaction mixture to inactivate the catalyst. The reaction mixture was then filtered to remove any solids. The major part of the vinyl acetate was removed from the reaction mixture by distillation at atmospheric pressure, the remainder of the vinyl acetate and acetic acid being removed under slight vacuum. The residue was taken up in 1 liter of ethyl ether and washed with two 1-liter portions of hydrochloric acid (1 part of 35% HCl to 3 parts of water). The ether solution was then washed with seven 500-ml. portions of 2% sodium hydroxide, and finally washed with water until neutral. The ether solution was dried using anhydrous sodium sulfate. The dried ether solution was combined with a similar solution prepared by duplicating this experiment. The combined solutions were distilled at 0.04 mm. Hg. The vinyl ester of hydrogenated rosin distilled over at 140° C. to 190° C. and was obtained in the amount of 1402 parts. This amounted to a yield of 70% based on the original hydrogenated rosin employed (2000 g. total). By this procedure there were also obtained 276 parts of a polymeric residue which was largely a polymer of the vinyl ester of the hydrogenated rosin.

The vinyl ester of hydrogenated rosin was redistilled at a pressure from 45–35 microns Hg and corresponding temperatures of 136–185° C. to obtain 7 different fractions plus a polymeric residue. These fractions were distinctive in that they were water-white in color.

*Example 5*

Two hundred grams of hydrogenated rosin of Example 4 were treated according to the process of Example 4 with the exception that the washing steps were eliminated. In the distillation of the residue resulting after stripping off the ether a cut of 133 g. was taken at 190°–230° C. and 0.1 mm. Hg pressure. This was the vinyl ester of hydrogenated rosin. It had an acid number of 16 and a saponification number of 164. It was yellow in color and the yellow color was not removed by redistillation.

\* \* \* \* \*

In describing the invention in its broad aspects heretofore, the term "rosin acid" has been employed. Thus, the monomers of the invention are defined as "vinyl esters of a hydrogenated rosin acid" and "vinyl esters of a dehydrogenated rosin acid." The term "rosin acid" is here used in a generic sense to include both commercial rosins, which are known to contain a neutral body fraction as well as a rosin acid fraction, and the rosin acid fractions obtained therefrom. Thus, there is included wood rosin, gum rosin, and the substantially entirely acidic fractions obtained therefrom as by distillation, combination saponification and extraction processes, etc. It is well known, too, that the acidic fraction contained in wood or gum rosin is a mixture of isomeric resin acids which include abietic, levopimaric, dextropimaric, neoabietic, isodextropimaric, etc. acids. Such specific compounds are equivalent to the naturally occurring mixtures found in wood or gum rosin for present purposes and the term "rosin acid" is intended to be inclusive thereof; however, from an economic standpoint, the naturally occurring wood or gum rosin or acidic fractions thereof are preferred.

Tall oil is well known to contain resin acids, fatty acids and a variety of nonacidic constituents. The resin acid fraction derived from tall oil is the equivalent of wood or gum rosin for many purposes, and for the purpose of this invention that equivalency exists. Accordingly, for present purposes the resin acid fraction of tall oil is to be considered as a "rosin acid."

The hydrogenated rosin acids employed in accordance with this invention may be made by any of the known procedures for hydrogenating rosin acids. As examples thereof, there may be mentioned the procedures of U. S. 2,094,117 and U. S. 2,155,036. Other procedures which are of interest are those described in U. S. 2,174,651; U. S. 1,973,865; U. S. 2,113,808; and U. S. 2,346,793.

Rosin acids of various degrees of hydrogenation may be used in preparing vinyl esters in accordance with this invention. In general, any of the prior art hydrogenated rosin acids may be employed. It is preferred, however, to employ a hydrogenated rosin acid which is at least 40% saturated with hydrogen and which has a content of abietic-type resin acids of not over 10%. It is most preferred to employ a hydrogenated rosin acid having a content of abietic-type resin acids of substantially 0.

"Per cent saturation with hydrogen" as applied to any particular sample of hydrogenated rosin acid means $$\frac{100\% \times \text{No. of g. of } H_2 \text{ absorbed per 100 g. of the initial rosin acid in preparing the sample}}{\text{No. of g. of } H_2 \text{ absorbed per 100 g. of the initial rosin acid in preparing a completely saturated rosin acid}}$$

A "completely saturated rosin acid" is one prepared under such strenuous conditions of hydrogenation that substantially all of the ethylenic double bonds contained in the starting rosin acid are saturated with hydrogen. The analytical procedure used to effect complete saturation of a rosin acid is described in detail infra.

As stated above, it is preferred that the hydrogenated rosin acid employed have a content of abietic-type resin acids of not over 10%, and most preferred that the content of abietic-type resin acids be substantially 0. By "abietic-type acids" there is meant the class of resin acids having the carbon skeleton of abietic acid, i. e.

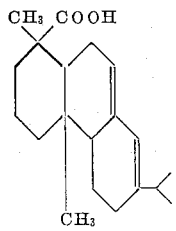

and having two ethylenic double bonds per molecule. Resin acids falling in this class are abietic acid, levopimaric acid, and neoabietic acid. This class of resin acids is sometimes described in the literature as acids of the levopimaric acid-abietic acid structural group.

As is evidenced by Example 4, a substantially completely hydrogenated rosin acid is rather unique in so far as this invention is concerned in that, when such a rosin acid is employed, it is possible to obtain vinyl esters which are water-white in color. Water-white color in a rosin derivative is a very unusual characteristic. It will be noted, however, in comparing Example 4 with Example 5 that the water-white color is obtainable only when the crude vinyl ester is thoroughly washed with aqueous mineral acid solution, with an aqueous alkaline solution, and with water prior to distillation under reduced pressure.

The dehydrogenated rosin acids used in accordance with this invention may be prepared according to known procedures. As exemplary of known procedures of dehydrogenating rosin acids there are mentioned the heating of rosin acid for one to two hours at 150° C. to 200° C. with a dehydrogenation catalyst such as iodine or sulfur, in the amount of 0.5 to 4% of the rosin acid. Dehydrogenated rosin acids may also be produced by what is known in the art as the "disproportionation" reaction. A disproportionated rosin acid is a rosin acid that has been treated with an active hydrogenation catalyst under conditions of reaction adapted to produce an intra- and intermolecular rearrangement of the hydrogen atoms in the rosin acids contained therein and in the absence of added substances capable of reducing the unsaturation of the rosin acid under the conditions of treatment. Such disproportionated rosin acids have a substantial proportion of dehydrogenated acidic constituents and are properly regarded as dehydrogenated rosin acids. See in this connection U. S. 2,154,629 to Littmann. Other materials which are properly classed as dehydrogenated rosin acids and which can be used as such in accordance with this invention are pyroabietic acid which is rich in dehydroabietic acid, etc. It may be prepared by heating a rosin acid for one to four hours at 260–315° C. The pseudopimaric acid which is described in U. S. 2,072,628 is similarly suitable.

The above-described procedures for preparing dehydrogenated rosin acids provide products having a rather wide variety of degrees of dehydrogenation. It will be understood in this connection that the resin acids present in wood and gum rosin are substantially entirely isomeric compounds possessing the empirical formula $C_{20}H_{30}O_2$. These isomers possess two ethylenic double bonds per molecule. Upon subjection to the known dehydrogenation processes a portion of the isomeric acids lose two atoms of hydrogen and it is believed that the resulting three ethylenic double bonds arrange themselves in the form of the most stable configuration, the benzene ring. Such acids have the empirical formula $C_{20}H_{28}O_2$ and are commonly referred to as "dehydroabietic acid." The dehydroabietic acid content of a dehydrogenated rosin acid may be ascertained by subjecting the same to ultraviolet absorption analysis. Obviously, the content of dehydroabietic acid of a dehydrogenated rosin acid is a measure of the degree of dehydrogenation of the original rosin acid.

As explained above, rosin acids having a variety of degrees of dehydrogenation result from the procedures for dehydrogenation described in the art. In general, any of the prior art dehydrogenated rosin acids may be employed in practicing this invention. It is preferred, however, to employ one having a dehydroabietic acid content of at least 40% and having an abietic-type resin acid content of not over 10%. It is still further preferred to employ a dehydrogenated rosin acid having a content of abietic-type resin acids of substantially 0.

As stated hereinabove, the ester employed in this invention may be any vinyl ester of a low molecular weight saturated fatty acid. Thus, the vinyl esters of acetic acid, propionic acid, butyric acid, hexoic acid, etc. may be employed. The vinyl ester of acetic acid is preferred since it is commercially available. Furthermore, the by-product of the reaction, acetic acid, is easily stripped from the reaction mixture by distillation.

It is essential, in accordance with this invention, to employ as a catalyst for the reaction a metal salt of a strong acid. Mercury salts are preferred although cadmium and zinc salts are also effective and may be used for this purpose. In general, the metal salts of any acid having a dissociation constant for the first hydrogen of at least $1 \times 10^{-2}$ may be employed. However, there are certain metal salts of acids having dissociation constants for the first hydrogen below this figure that are effective. As illustrative of the mercury salts which may be employed in practicing this invention, there may be mentioned the mercury salts of sulfuric acid, phosphoric acid, silicotungstic acid, boron trifluoride-carboxylic acid, trichloroacetic acid, etc. The mercury salts of hydrochloric acid are also effective in some instances. Both mercuric or mercurous salts are effective; however, the mercuric salts are preferred. As examples of effective cadmium and zinc salts, there may be mentioned cadmium sulfate, zinc sulfate, etc. With respect to the amount of metal salt to employ as catalyst, there should in general be employed sufficient of the salt such that it does exert a definite catalytic effect on the reaction with which this invention is concerned. In other words, it can be said that a catalytic amount of the metal salt should be used. No particular minimum amount can be set which will be generally applicable to all mercury salts having a catalytic effect on the subject reaction, there being considerable variation in the applicable minimum in going from one salt to another. It may be stated, however, that in the case of mercuric sulfate an amount of catalyst as low as 0.0095 mol per mol of stabilized rosin acid has proven effective.

It is preferred to form the catalyst in situ in the reaction mixture rather than to add it as such to the reactants. The preparation of a mercury catalyst in situ in the reaction mixture is described below for purpose of illustration. Cadmium and zinc catalysts may be prepared similarly. According to the preferred procedure, a strong acid of the type referred to in the foregoing paragraph such as sulfuric acid and a mercury salt of a relatively weak acid are separately added to the reactants. Mercuric acetate, for example, may be employed or any other mercury salt of a monobasic organic acid having a dissociation constant similar to or lower than that of acetic acid at a given temperature. By proceeding in this manner there is formed in the reaction mixture the mercury salt of the strong acid, for example, mercuric sulfate, which is the true catalyst for the reaction. When this procedure is employed, varying amounts of the strong acid may usually be employed with any given amount of mercuric salt. Thus, there may be employed just enough acid to form the normal mercury salt. On the other hand, only half the amount of acid required to form the normal salt is effective in some cases. At the same time, a small or rather substantial excess of the strong acid may be effectively employed. It is obvious, of course, that with respect to any given combination of reactants, i. e., the vinyl ester of a low molecular weight acid and the stabilized rosin acid some experimentation with respect to reaction conditions must be undertaken in order to arrive at the best reaction conditions to employ.

The reaction here involved may be carried out at temperatures as low as normal room temperature. Higher temperatures should be employed, however, to achieve practical reaction rates. Thus, it is preferred to carry the reaction out at the reflux temperature of the reaction mixture. This usually means that the reaction temperature is that of boiling vinyl acetate (B. P. 72° C. at 760 mm. Hg) or whatever other vinyl ester is employed as starting material. Of course, higher temperatures may be employed by use of superatmospheric pressure.

At the end of the heating period it is desirable to inactivate the catalyst. This may be effected by removing the metal ions as by precipitation. Thus, in the case of mercuric sulfate, the mercury ions would be removed. However, the inactivation of the catalyst is most easily effected by removing the acid anion. Referring again to the example of mercuric sulfate, the sulfate ion would be removed. In the examples sodium acetate has been employed for this purpose. $Na_2SO_4$ is insoluble in vinyl acetate. A wide variety of other alkaline materials may be employed and as exemplary of them all the following are mentioned: sodium carbonate, calcium carbonate, calcium acetate, barium carbonate, calcium oxide, etc. While it is not entirely necessary to inactivate the catalyst, it is highly desirable to do so due to the fact of the reversibility of the acidolysis reaction. Obviously, when the excess vinyl acetate is removed, the equilibrium is shifted to the left-hand side of the following equation.

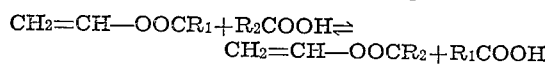

$$CH_2=CH-OOCR_1 + R_2COOH \rightleftharpoons$$
$$CH_2=CH-OOCR_2 + R_1COOH$$

where $R_1COOH$ and $R_2COOH$ are low molecular weight acid and rosin acid, respectively. Hence, from the standpoint of obtaining high yields of vinyl ester of stabilized rosin acid, it is important to inactivate the catalyst at the end of the heating period. The amount of alkaline material employed should be at least sufficient to convert all of the acid anion to an insoluble salt.

As illustrated by the examples, a purification technique has been developed for use particularly where vinyl esters of a stabilized rosin of very light color are desired. This technique involves subjecting the relatively crude vinyl ester after the vinyl acetate and acetic acid have been stripped off to washing with aqueous mineral acid, with aqueous alkali, and with water. When this technique is used in conjunction with vinyl esters of substantially completely hydrogenated rosin acid, products are obtainable which are actually water-white. This purification technique, however, is clearly not a necessary part of the process of this invention.

The process herein described is advantageous in that it provides a method for making a vinyl ester of a rosin acid by acidolysis of a readily available vinyl ester of a lower fatty acid. Heretofore, no method for making vinyl esters of a rosin acid involving acidolysis has been available.

Furthermore, the process is advantageous in that it produces vinyl esters of a rosin acid without an undue amount of concomittant polymerization thereof. Polymerization is a major problem in the preparation of vinyl esters of carboxylic acids by the procedure of direct vinylation with acetylene. It is much less of a problem in the subject acidolysis process. While some polymers are formed, they are not formed in such large amounts as to cut down appreciably on the yields of monomer.

The analytical method referred to supra for quantitatively completely hydrogenating a rosin acid is the following. This method effects removal of all unsaturation of the rosin acid existing due to the presence of carbon-carbon double bonds and aromatic nuclei.

The method consists of reducing a suspension of platinum oxide in acetic acid to platinum black in an atmosphere of hydrogen, adding a weighed sample of the rosin acid to the catalyst suspension and measuring the amount of hydrogen absorbed by the rosin acid.

The reagents employed are (1) acetic acid, empyreuma-free (passing dichromate test), (2) platinum oxide catalyst of the type described by Voorhees and Adams, J. A. C. S., 44, 1397 (1922) and by Adams and Shriner, J. A. C. S., 45, 2171 (1923), and (3) commercial hydrogen.

The apparatus employed includes a gas measuring buret, a reaction flask, and a magnetic stirrer. The gas buret employed is that described by C. R. Noller and M. R. Barusch, Industrial & Engineering Chemistry, Anal. Ed., vol. 14, 907 (1942) with the exceptions (1) there is a T and stopcock between the reaction flask (B) and the calibrated section of the buret (A) so that air may be removed and hydrogen admitted by alternate evacuation and filling and (2) there is a 25 ml. reservoir just below the calibrations of said section. The reaction flask employed is similar to that of Noller et al. except that in place of the side arm with cup it has a side arm fitted with a ground glass stopper. The stopper end (within the flask) is so made as to permit a sample cup placed thereon to drop to the bottom of the flask when the stopper handle is turned 90 degrees.

Remove the side arm of the reaction flask and weigh in 0.10±0.01 g. PtO catalyst. Add a glass-encased iron wire and wash the catalyst into the flask with 5 ml. acetic acid. Grease the upper half of the ground joint on the side arm and insert in flask. Weigh the sample of rosin acid (0.15-0.20 g.) to the nearest 0.0001 g. into a 9×15 mm. sample cup. If the sample is a powdered solid, moisten with a drop of acetic acid. Place the sample cup in the neck of the flask where it is supported by the end of the stopper. Connect the flask to the gas buret using a thin film of grease on the ground glass joint, evacuate the apparatus and fill the same with hydrogen. Repeat the evacuation and filling cycle four times. The final filling with hydrogen should almost completely fill the reservoir at the base of the buret. When this condition is reached, the flow of hydrogen into the buret is stopped by closing the proper stopcocks.

A magnetic stirrer is placed below the reaction flask and started. The speed is regulated so that stirring is just sufficiently vigorous to break the liquid surface. At this point reduction of the catalyst starts. When the catalyst is completely reduced to platinum black as evidenced by no further change in the mercury level (this requires about 1 hour), the mercury surfaces in the buret are leveled using the mercury reservoir. This condition of complete reduction is determined by reading the leveled mercury volume at 30-minute intervals until the volume is constant within 0.1 ml.

When complete reduction of the PtO has been achieved, record the gas volume, temperature, and barometric pressure. The gas volume at this point should not be more than 45 ml. Rotate the side arm so as to allow the sample cup to drop into the acetic acid solution. Permit hydrogenation to proceed for about 16 hours. Read the final gas volume, temperature, and pressure. Temperature is read to the nearest 0.1° C. and the pressure to the nearest 1 mm. Correct the initial and final gas volumes to standard conditions, first adding the volume of the uncalibrated system.

$$\frac{(Corrected\ initial\ volume - corrected\ final\ volume)}{0.00900} = \%\ H_2\ absorbed\ grams\ of\ sample$$

This application is a continuation-in-part of application Serial No. 126,234 filed November 8, 1949.

The vinyl esters of chemically stabilized rosin acids and polymers of said vinyl esters, disclosed herein, are claimed in application Serial No. 185,324, filed September 16, 1950 by John C. Robinson, Jr. and Walter S. Ropp.

What I claim and desire to protect by Letters Patent is:

1. A process for preparing a vinyl ester of a stabilized rosin acid which comprises heating a chemically stabilized rosin acid with an excess of a vinyl ester of a low molecular weight saturated fatty acid in the presence of a catalytic amount of a mercury salt of a strong acid, and separating the resulting vinyl ester of the chemically stabilized rosin acid from the other ingredients of the reaction mixture.

2. A process for preparing a vinyl ester of a stabilized rosin acid which comprises heating a chemically stabilized rosin acid with an excess of a vinyl ester of a low molecular weight saturated fatty acid in the presence of a catalytic amount of a mercury salt of a strong acid, and separating the resulting vinyl ester of the chemically stabilized rosin acid from the other ingredients of the reaction mixture by distillation.

3. A process for preparing a vinyl ester of a stabilized rosin acid which comprises heating a chemically stabilized rosin acid with an excess of vinyl acetate in the presence of a catalytic amount of a mercury salt of a strong acid, and separating the resulting vinyl ester of the chemically stabilized rosin acid from the other ingredients of the reaction mixture by distillation.

4. A process for preparing a vinyl ester of a stabilized rosin acid which comprises heating a chemically stabilized rosin acid with an excess of vinyl acetate in a molar ratio of at least 3 mols of the vinyl acetate per mol of the acid in the presence of a catalytic amount of a mercury salt of a strong acid, and separating the resulting vinyl ester of the chemically stabilized rosin acid from the other ingredients of the reaction mixture by distillation.

5. A process for preparing a vinyl ester of a stabilized rosin acid which comprises heating a chemically stabilized rosin acid with an excess of vinyl acetate in a molar ratio of at least 3 mols of the vinyl acetate per mol of the acid in the presence of a catalytic amount of a mercury salt of a strong acid, inactivating the catalyst in the reaction mixture, and separating the resulting vinyl ester of the chemically stabilized rosin acid from the other ingredients of the reaction mixture by distillation.

6. A process for preparing a vinyl ester of a stabilized rosin acid which comprises heating a chemically stabilized rosin acid with an excess of vinyl acetate in a molar ratio of at least 3 mols of the vinyl acetate per mol of the acid in the presence of a catalytic amount of mercuric sulfate, inactivating the mercuric sulfate catalyst in the reaction mixture, and separating the resulting vinyl ester of the chemically stabilized rosin acid from the other ingredients of the reaction mixture by distillation.

7. A process for preparing a vinyl ester of a stabilized rosin acid which comprises hydrogenating said rosin acid, heating the resulting hydrogenated rosin acid with vinyl acetate in a molar ratio of at least 3 mols of the vinyl acetate per mol of the hydrogenated rosin acid in the presence of a catalytic amount of a mercury salt of a strong acid, and separating the resulting vinyl ester of the hydrogenated rosin acid from the other ingredients of the reaction mixture by distillation.

8. A process for preparing a vinyl ester of a stabilized rosin acid which comprises dehydrogenating said rosin acid, heating the resulting dehydrogenated rosin acid with vinyl acetate in a molar ratio of at least 3 mols of the vinyl acetate per mol of the dehydrogenated rosin acid in the presence of a catalytic amount of a mercury salt of a strong acid, and separating the resulting vinyl ester of the dehydrogenated rosin acid from the other ingredients of the reaction mixture by distillation.

9. A process for preparing a vinyl ester of a stabilized rosin acid which comprises heating a chemically stabilized rosin acid with vinyl acetate in a molar ratio of at least 3 mols of the vinyl acetate per mol of the acid in the presence of a catalytic amount of a mercury salt catalyst formed in the reaction mixture by addition thereto of a strong acid and a mercury salt of a relatively weak organic acid, and separating the resulting vinyl ester of chemically stabilized rosin acid from the other ingredients of the reaction mixture by distillation.

10. A process for preparing a vinyl ester of a stabilized rosin acid which comprises heating a chemically stabilized rosin acid with vinyl acetate in a molar ratio of at least 3 mols of the vinyl acetate per mol of the acid in the presence of a catalytic amount of a mercury salt catalyst formed in the reaction mixture by addition thereto of a strong acid and the mercury salt of a relatively weak organic acid, inactivating the mercury salt catalyst in the reaction mixture, and separating the resulting vinyl ester of chemically stabilized rosin acid from the other ingredients of the reaction mixture by distillation.

11. A process for preparing a vinyl ester of a stabilized rosin acid which comprises heating a chemically stabilized rosin acid with vinyl acetate in a molar ratio of at least 3 mols of the vinyl acetate per mol of the acid in the presence of a catalytic amount of a mercury salt catalyst formed in the reaction mixture by addition thereto of a strong acid and mercuric acetate, inactivating the mercuric salt catalyst in the reaction mixture, and separating the resulting vinyl ester of the chemically stabilized rosin acid from the other ingredients of the reaction mixture by distillation.

12. A process for preparing a vinyl ester of a stabilized rosin acid which comprises heating a chemically stabilized rosin acid with vinyl acetate in a molar ratio of at least 3 mols of the vinyl acetate per mol of the acid in the presence of a catalytic amount of mercuric sulfate catalyst formed in the reaction mixture by addition thereto of sulfuric acid and mercuric acetate, inactivating the mercuric sulfate catalyst in the reaction mixture, and separating the resulting vinyl ester of the chemically stabilized rosin acid from the other ingredients of the reaction mixture by distillation.

13. A process for preparing a vinyl ester of a stabilized rosin acid which comprises heating a chemically stabilized rosin acid with an excess of a vinyl ester of a low molecular weight saturated fatty acid in the presence of a catalytic amount of a metal salt of a strong acid, and separating the resulting vinyl ester of the chemically stabilized rosin acid from the other ingredients of the reaction mixture, said metal salt being selected from the group consisting of cadmium, zinc and mercury salts.

14. A process for preparing a vinyl ester of a stabilized rosin acid which comprises hydrogenating said rosin acid until a hydrogenated rosin acid which is at least 40% saturated with hydrogen and which has a content of abietic-type resin acids of not over 10% is produced, heating the resulting hydrogenated rosin acid with vinyl acetate in a molar ratio of at least 3 mols of the vinyl acetate per mol of the hydrogenated rosin acid in the presence of a catalytic amount of a mercury salt of a strong acid, and separating the resulting vinyl ester of the hydrogenated rosin acid from the other ingredients of the reaction mixture by distillation.

15. A process for preparing a vinyl ester of a stabilized rosin acid which comprises dehydrogenating said rosin acid until a dehydrogenated rosin acid having a dehydroabietic acid content of at least 40% and having an abietic-type resin acid content of not over 10% is produced, heating the resulting dehydrogenated rosin acid with vinyl acetate in a molar ratio of at least 3 mols of the vinyl acetate per mol of the dehydrogenated rosin acid in the presence of a catalytic amount of a mercury salt of a strong acid, and separating the resulting vinyl ester of the dehydrogenated rosin acid from the other ingredients of the reaction mixture by distillation.

JOHN C. ROBINSON, Jr.

REFERENCES CITED

The following references are of record in the file of this patent:

UNITED STATES PATENTS

| Number | Name | Date |
|---|---|---|
| 2,448,660 | Croxall et al. | Sept. 7, 1948 |